US009671013B2

(12) United States Patent
Fujikawa

(10) Patent No.: US 9,671,013 B2
(45) Date of Patent: Jun. 6, 2017

(54) HYDRAULIC PRESSURE SUPPLY APPARATUS

(71) Applicant: HONDA MOTOR CO., LTD., Tokyo (JP)

(72) Inventor: Atsushi Fujikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 148 days.

(21) Appl. No.: 14/769,194

(22) PCT Filed: Feb. 3, 2014

(86) PCT No.: PCT/JP2014/052427
§ 371 (c)(1),
(2) Date: Aug. 20, 2015

(87) PCT Pub. No.: WO2014/132752
PCT Pub. Date: Sep. 4, 2014

(65) Prior Publication Data
US 2015/0377344 A1 Dec. 31, 2015

(30) Foreign Application Priority Data

Feb. 26, 2013 (JP) .................................. 2013-035523

(51) Int. Cl.
*F16H 61/00* (2006.01)
*F16H 57/04* (2010.01)
(Continued)

(52) U.S. Cl.
CPC ........ *F16H 61/0025* (2013.01); *F15B 11/024* (2013.01); *F15B 15/08* (2013.01);
(Continued)

(58) Field of Classification Search
CPC ........ F15B 11/024; F15B 15/08; F15B 21/14; F16H 57/0434; F16H 61/00; F16H 61/0021; F16H 61/0025; F16H 2061/0037
See application file for complete search history.

(56) References Cited

U.S. PATENT DOCUMENTS

2017/0009877 A1* 1/2017 Ichimura ............. F16H 61/0206

FOREIGN PATENT DOCUMENTS

JP 2008-157322 A 7/2008
JP 2010-078088 A 4/2010
(Continued)

OTHER PUBLICATIONS

International Search Report and Written Opinion dated May 13, 2014 corresponding to International Patent Application No. PCT/JP2014/052427 and English translation thereof.

*Primary Examiner* — Logan Kraft
(74) *Attorney, Agent, or Firm* — Squire Patton Boggs (US) LLP

(57) ABSTRACT

It is configured to have a first hydraulic pump connected to a drive source, a second hydraulic pump connected to a rotor of the first hydraulic pump, a first regulator valve that regulates pressure of the hydraulic oil discharged from the first hydraulic pump to a third oil passage that connects a discharge port of the first hydraulic pump and a hydraulic actuator, a fourth oil passage that connects the second hydraulic pump and a lubrication system of the hydraulic actuator, a second regulator valve that regulates pressure of the hydraulic oil discharged from the first regulator valve to a pressure lower than a line pressure, and an one-way valve that is installed in a second oil passage connecting the second hydraulic pump and a reservoir and permits supply of hydraulic oil from the reservoir only to the second hydraulic pump.

3 Claims, 2 Drawing Sheets

(51) Int. Cl.
*F15B 21/14* (2006.01)
*F15B 11/024* (2006.01)
*F15B 15/08* (2006.01)

(52) U.S. Cl.
CPC ......... *F15B 21/14* (2013.01); *F16H 57/0434* (2013.01); *F16H 61/00* (2013.01); *F16H 61/0021* (2013.01); *F16H 2061/0037* (2013.01)

(56) References Cited

FOREIGN PATENT DOCUMENTS

| | | |
|---|---|---|
| JP | 2011-080537 A | 4/2011 |
| JP | 2011-094684 A | 5/2011 |
| JP | 2012-082947 A | 4/2012 |
| JP | 2012-237402 A | 12/2012 |

\* cited by examiner

HYDRAULIC PRESSURE SUPPLY APPARATUS

TECHNICAL FIELD

This invention relates to a hydraulic pressure supply apparatus.

BACKGROUND ART

Patent Document 1 teaches a hydraulic pressure supply apparatus comprising a main oil pump driven by a drive source (internal combustion engine), a sub oil pump driven by a hydraulic motor, a first regulator valve that regulates pressure discharged from the main oil pump to line pressure, and a second regulator valve that is connected to a first discharge port of the first regulator valve and regulates pressure discharged during pressure regulation to lower pressure secondary pressure, and configured to have a second discharge port of the first regulator valve connected to an intake passage of the hydraulic motor, so that the sub oil pump is driven by excess hydraulic oil discharged from the first regulator valve.

PRIOR ART REFERENCES

Patent References

Patent Reference 1: Japanese Laid-Open Patent No. 2011-080537

SUMMARY OF INVENTION

Problems to be Solved by the Invention

Thanks to the aforesaid configuration, the prior art of Patent Document 1 makes regenerative use of excess hydraulic oil (hydraulic pressure) of high line pressure; however, the structure is complicated because the need for the hydraulic motor to drive the sub oil pump results in three hydraulic pumps (motors) being necessary. Moreover, the fact that the low-pressure system is supplied with depressurized high-pressure line pressure causes a proportional loss of hydraulic pressure energy.

Therefore, the object of this invention is to overcome the aforesaid drawbacks by providing a hydraulic pressure supply apparatus of simple structure that makes regenerative use of excess hydraulic oil of high line pressure and also reduces hydraulic pressure energy loss.

Means for Solving the Problems

In order to achieve the object, a hydraulic pressure supply apparatus recited in claim 1 is configured to comprise a first hydraulic pump having a first rotor connected to a drive source; a second hydraulic pump having a second rotor connected to the first rotor of the first hydraulic pump; a first oil passage that connects an intake port of the first hydraulic pump and a reservoir that contains hydraulic oil; a second oil passage that connects an intake port of the second hydraulic pump and the reservoir; a third oil passage that connects a discharge port of the first hydraulic pump and a hydraulic actuator; a first regulator valve that regulates pressure of the hydraulic oil discharged from the discharge port of the first hydraulic pump to the third oil passage to a line pressure; a fourth oil passage that connects a discharge port of the second hydraulic pump and a lubrication system of the hydraulic actuator; a fifth oil passage that connects excess hydraulic oil discharged from the first regulator valve to the second oil passage; a second regulator valve that regulates pressure of the excess hydraulic oil discharged from the first regulator valve to the fifth oil passage to a medium pressure that is lower than the line pressure; and a check valve that is installed in the second oil passage at a position between a junction to the fifth oil passage and the reservoir and permits supply of hydraulic oil from the reservoir only to the second hydraulic pump.

The apparatus recited in claim 2 further includes: a third regulator valve that regulates pressure of the hydraulic oil discharged from a discharge port of the second hydraulic pump to the fourth oil passage to a pressure lower than the medium pressure regulated by the second regulator valve.

The apparatus recited in claim 3 is configured such that, the second regulator valve regulates pressure of the excess hydraulic oil discharged from the first regulator valve to the fifth oil passage to the medium pressure that is lower than the line pressure, by regulating flow volume so that back-pressure of an output port of the first regulator valve becomes lower than the line pressure by a prescribed pressure.

Effects of the Invention

The hydraulic pressure supply apparatus recited in claim 1 is configured such that, it comprises a first hydraulic pump having a first rotor connected to a drive source; a second hydraulic pump having a second rotor connected to the first rotor of the first hydraulic pump; a first oil passage that connects an intake port of the first hydraulic pump and a reservoir that contains hydraulic oil; a second oil passage that connects an intake port of the second hydraulic pump and the reservoir; a third oil passage that connects a discharge port of the first hydraulic pump and a hydraulic actuator; a first regulator valve that regulates pressure of the hydraulic oil discharged from the discharge port of the first hydraulic pump to the third oil passage to a line pressure; a fourth oil passage that connects a discharge port of the second hydraulic pump and a lubrication system of the hydraulic actuator; a fifth oil passage that connects excess hydraulic oil discharged from the first regulator valve to the second oil passage; a second regulator valve that regulates pressure of the hydraulic oil discharged from the first regulator valve to the fifth oil passage to a medium pressure that is lower than the line pressure; and an one-way valve that is installed in the second oil passage at a position between a junction to the fifth oil passage and the reservoir and permits supply of hydraulic oil from the reservoir only to the second hydraulic pump. With this, it becomes possible to use excess hydraulic oil of the high line pressure for regeneration and at the same time, make the structure simple.

Specifically, since it is configured such that, the inner rotor (second rotor) of the second hydraulic pump is connected to the inner rotor (first rotor) of the first hydraulic pump that is connected to the drive source, while excess hydraulic oil discharged from the first regulator valve that regulates the pressure of the hydraulic oil discharged from the first hydraulic pump to the line pressure is supplied to the second oil passage that connects the second hydraulic pump and the reservoir, it becomes possible to drive the second hydraulic pump to function also as a hydraulic motor by the excess hydraulic oil discharged from the first regulator valve, whereby enabling to reduce the load of the drive source by a proportional extent. With this, it becomes possible to use the excess hydraulic oil of the high line pressure to the regeneration, like the prior art of Patent Document 1. Moreover, since the regeneration requires only the first and second hydraulic pumps, the structure can be made simple.

Further, since it is configured such that, the discharge port of the second hydraulic pump and the lubrication system of the hydraulic actuator is connected by the fourth oil passage, in other words, since it is not necessary to depressurize and supply high-pressure hydraulic oil discharged from the first hydraulic pump, it becomes possible to avoid loss of hydraulic pressure energy.

Further, since it is configured such that, the second regulator valve regulates the pressure of the hydraulic oil discharged from the first regulator valve to a pressure lower than the line pressure, i.e., to the medium pressure, in addition to the effects mentioned above, it becomes possible to maintain the backpressure of the output port of the first regulator valve to a proper value.

In the apparatus recited in claim 2, since it is configured to include: a third regulator valve that regulates pressure of the hydraulic oil discharged from a discharge port of the second hydraulic pump to the fourth oil passage to a pressure still lower than the medium pressure regulated by the second regulator valve. With this, in addition to the effects mentioned above, it becomes possible to regulate the pressure of the hydraulic oil to be supplied to the lubrication system of the hydraulic actuator to a minimum necessary low pressure to avoid loss of hydraulic pressure energy.

In the apparatus recited in claim 3, since it is configured such that, the second regulator valve regulates pressure of the excess hydraulic oil discharged from the first regulator valve to the fifth oil passage to the medium pressure that is lower than the line pressure, by regulating flow volume so that backpressure of an output port of the first regulator valve becomes lower than the line pressure by a prescribed pressure. With this, in addition to the effects mentioned above, it becomes possible to maintain the backpressure of the output port of the first regulator valve to a proper value. Accordingly, when the first hydraulic pump is driven at high speed rotation of the drive source, it becomes possible to make the second hydraulic pump function as a hydraulic motor, thereby enabling to achieve regeneration that reduces the pump drive torque of the drive source.

DESCRIPTION OF EMBODIMENTS

An embodiments for implementing a hydraulic pressure supply apparatus according to this invention is explained with reference to the attached drawings.

Embodiment

Figure 1:
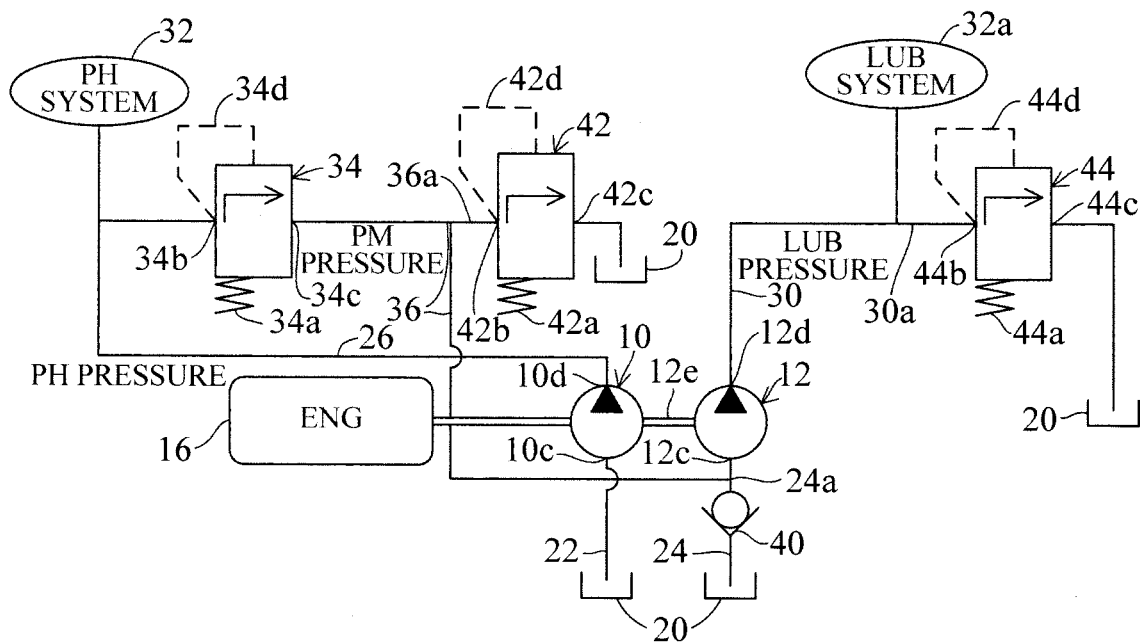
FIG. 1 is an overall schematic diagram of a hydraulic pressure supply apparatus according to an embodiment of this invention.

FIG. 1 is an overall schematic diagram of a hydraulic pressure supply apparatus according to the embodiment of this invention.

Figure 2:
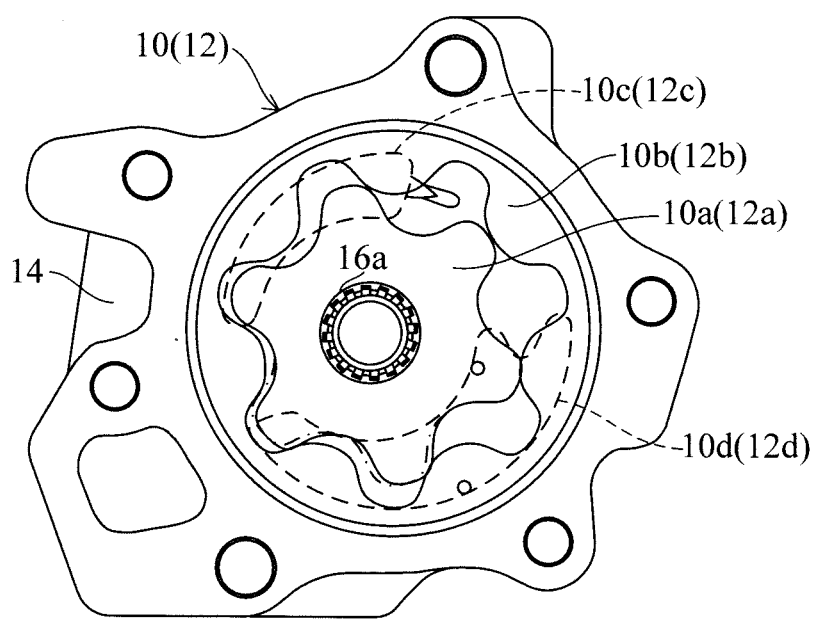
FIG. 2 is a cutaway plan view of a hydraulic pump shown in FIG. 1.

Symbol 10 in FIG. 1 designates a first hydraulic pump (oil pump), and symbol 12 designates a second hydraulic pump (oil pump). FIG. 2 is a cutaway plan view of the first hydraulic pump 10. The structure of the second hydraulic pump 12, not shown in the drawings, is similar. The hydraulic pressure supply apparatus of this embodiment will be explained taking as an example a hydraulic pressure supply apparatus for a vehicle automatic transmission, specifically an automatic transmission like that described in Japanese Laid-Open Patent Application No. 2012-237402.

As shown, the first hydraulic pump 10 (and second hydraulic pump 12) comprise inscribed gear pumps each rotatably housed inside a casings structured to be attachable to a case 14 of the automatic transmission, and are each equipped with an inner rotor (drive) 10a (12a) having 6 peripheral inner teeth and, surrounding the inner rotor 10a (12a), with an outer (driven) rotor 10b (12b) having 7 outer teeth that partially mesh with inner teeth. The second hydraulic pump 12 is structured to have a smaller volume than the first hydraulic pump 10.

The inner rotor 10a of the first hydraulic pump 10 is connected to an engine (ENG; internal combustion engine (drive source)) 16. More specifically, the inner rotor 10a of the first hydraulic pump 10 is spline-fitted on a gear drive shaft 16a connected to a crankshaft of the engine 16 by a chain to be rotated (driven) synchronously with the rotation of the engine 16.

The outer rotor 10b (and 12b) follow the rotation of the inner rotor 10a (and 12a), and hydraulic oil (ATF) contained in a reservoir 20 is sucked into intake port 10c (and 12c) by the rotation of the rotors, passes between the inner teeth and outer teeth and is discharged from a discharge port 10d (12d). The reservoir 20 is constituted by an oil pan formed at the bottom of the case 14 of the automatic transmission.

The inner rotor 12a of the second hydraulic pump 12 is mechanically connected to the inner rotor 10a of the first hydraulic pump 10 through a connecting member 12e and is configured to rotate together with the first hydraulic pump 10 when the first hydraulic pump 10 is driven to rotate by the engine 16.

Returning to the explanation of FIG. 1, the first hydraulic pump 10 and the second hydraulic pump 12 are driven to rotate by the engine 16 so as to pump hydraulic oil contained in the reservoir 20 into the intake ports 10c and 12c through a first oil passage 22 and a second oil passage 24 and discharge pressurized hydraulic oil from the discharge ports 10d and 12d into a third oil passage 26 and a fourth oil passage 30.

The third oil passage 26 is connected to a hydraulic actuator (designated "PH system") 32 and supplies pressure (hydraulic pressure) of hydraulic oil discharged from the discharge port of the first hydraulic pump 10 to the hydraulic actuator 32 as line pressure (PH pressure).

The fourth oil passage 30 is connected to a lubrication system (designated "LUB system") 32a of the hydraulic actuator 32. The hydraulic actuator 32 comprises a hydraulic clutch or a torque converter lock-up clutch or other element, and by the term "lubrication system 32a" is meant the constituent component thereof that requires lubrication.

A first regulator valve 34 is connected to the third oil passage 26. The first regulator valve 34 is equipped with a spool (not shown) biased to a predetermined position by a spring 34a, an input port 34b opened and closed by the spool, an output port 34c, and a feedback oil passage 34d (represented by a broken line in the drawing).

The input port 34b of the first regulator valve 34 is connected to the third oil passage 26, and the output port 34c thereof is connected to the second oil passage 24 through a fifth oil passage 36. A check valve (one-way valve) 40 is interposed in the second oil passage 24 between the reservoir 20 and the intake port 12c of the second hydraulic pump 12.

More specifically, the output port 34c of the first regulator valve 34 is connected from the fifth oil passage 36 through a junction 24a (between the check valve 40 and the intake port 12c of the second hydraulic pump 12) to the second oil passage 24. The check valve 40 permits supply of hydraulic oil from the reservoir 20 only to the second hydraulic pump 12.

The first regulator valve 34 receives part of the hydraulic oil supplied to the hydraulic actuator 32 through the input port 34b whose opening is determined by the spool, and by regulation through the feedback oil passage 34d, regulates the pressure of hydraulic oil supplied (discharged) from the first hydraulic pump 10 to the third oil passage 26 to line pressure (PH pressure).

Excess hydraulic oil discharged from the output port 34c of the first regulator valve 34 is on the one hand sent from the fifth oil passage 36 to the intake port 12c of the second hydraulic pump 12 as stated earlier and is on the other hand supplied to a branch passage 36a.

A second regulator valve 42 is installed in the branch passage 36a. Similarly to the first regulator valve 34, the second regulator valve 42 is equipped with a spool (not shown) biased to a predetermined position by a spring 42a, an input port 42b opened and closed by the spool, an output port 42c, and a feedback oil passage 42d (represented by a broken line in the drawing).

The second regulator valve 42 regulates the pressure of hydraulic oil (excess hydraulic oil) discharged from the output port 34c of the first regulator valve 34 and passed through the branch passage 36a of the fifth oil passage 36 to a medium pressure (PM pressure) lower than the line pressure (PH pressure) by a prescribed value.

In other words, excess hydraulic oil discharged from the output port 34c of the first regulator valve 34 is regulated to a medium pressure by the second regulator valve 42 and supplied through the fifth oil passage 36 and second oil passage 24 to the second hydraulic pump 12. However, if the flow volume thereof is greater than the volume (displacement) of the second hydraulic pump 12, a locked condition occurs owing to the backpressure of the output port 34c of the first regulator valve 34 becoming higher than the PH pressure, while if the flow volume is smaller than the volume of the second hydraulic pump 12, regeneration becomes impossible owing to depressurization prior to supply to the second hydraulic pump 12.

The second regulator valve 42 therefore prevents occurrence of the aforesaid problem by, when the flow volume of excess hydraulic oil discharged from the first regulator valve 34 is great, pressure regulating the flow volume thereof so that the backpressure of the output port 34c of the first regulator valve 34 becomes a medium pressure (PM pressure) lower than the PH pressure by the prescribed value. In other words, flow volume exceeding the volume of the second hydraulic pump 12 is discharged (released) from the output port 42c to the reservoir 20 so as to prevent the aforesaid problem from occurring.

Further, the fourth oil passage 30 is connected through a branch passage 30a to the lubrication system (LUB system) 32a of the hydraulic actuator 32, and a third regulator valve 44 is installed in the branch passage 30a.

Similarly to the first and second regulator valves 34, 42, the third regulator valve 44 is equipped with a spool (not shown) biased to a predetermined position by a spring 44a, an input port 44b opened and closed by the spool, an output port 44c, and a feedback oil passage 44d (represented by a broken line in the drawing).

The third regulator valve 44 receives hydraulic oil discharged from the discharge port 12d of the second hydraulic pump 12 through the input port 34b whose opening is determined by the spool, and by discharging it through the output port 44c to the reservoir 20, regulates the pressure of hydraulic oil passing through the fourth oil passage 30 to a lubrication pressure (LUB pressure) still lower than the medium pressure (PM pressure). The pressure-regulated hydraulic oil is supplied to the lubrication system 32a of the hydraulic actuator 32.

Now follows an explanation of the operation the hydraulic pressure supply apparatus according to this embodiment.

Figure 3:
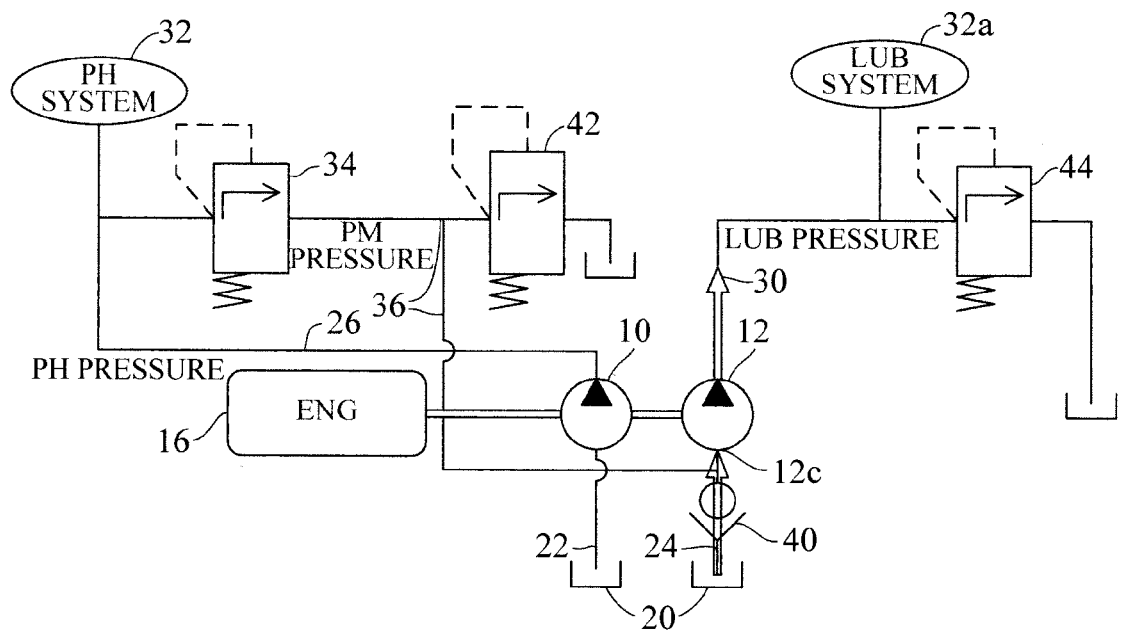
FIG. 3 is a schematic diagram similar to FIG. 1 showing operation of the apparatus shown in FIG. 1 during low speed rotation of an engine.

FIG. 3 is a schematic diagram similar to FIG. 1 showing the operation of the apparatus during low speed rotation of the engine 16.

In the illustrated case, the first hydraulic pump 10 driven by the engine 16 pumps hydraulic oil from the reservoir 20 and discharges it into the third oil passage 26. The pressure of the discharged hydraulic oil (hydraulic pressure) is regulated to line pressure (PH pressure) by the first regulator valve 34 and supplied to the hydraulic actuator 32.

The second hydraulic pump 12 mechanically connected to the first hydraulic pump 10 pumps hydraulic oil from the reservoir 20 through the check valve 40 and discharges it into the fourth oil passage 30 as indicated by an arrow. The pressure (hydraulic pressure) of the discharged hydraulic oil is regulated to lubrication pressure (LUB pressure) and supplied to the lubrication system 32a of the hydraulic actuator 32.

At this time, the excess hydraulic oil discharged from the output port 34c of the first regulator valve 34 is supplied through the fifth oil passage 36 and the second oil passage 24 to the intake port 12c of the second hydraulic pump 12, and since the rotational speed of the engine 16 is low, the pressure and flow volume of the excess hydraulic oil discharged from the first regulator valve 34 are small, so that supply of excess hydraulic oil, along with hydraulic pumped from the reservoir 20, is only to the lubrication system 32a of the hydraulic actuator 32.

Figure 4:
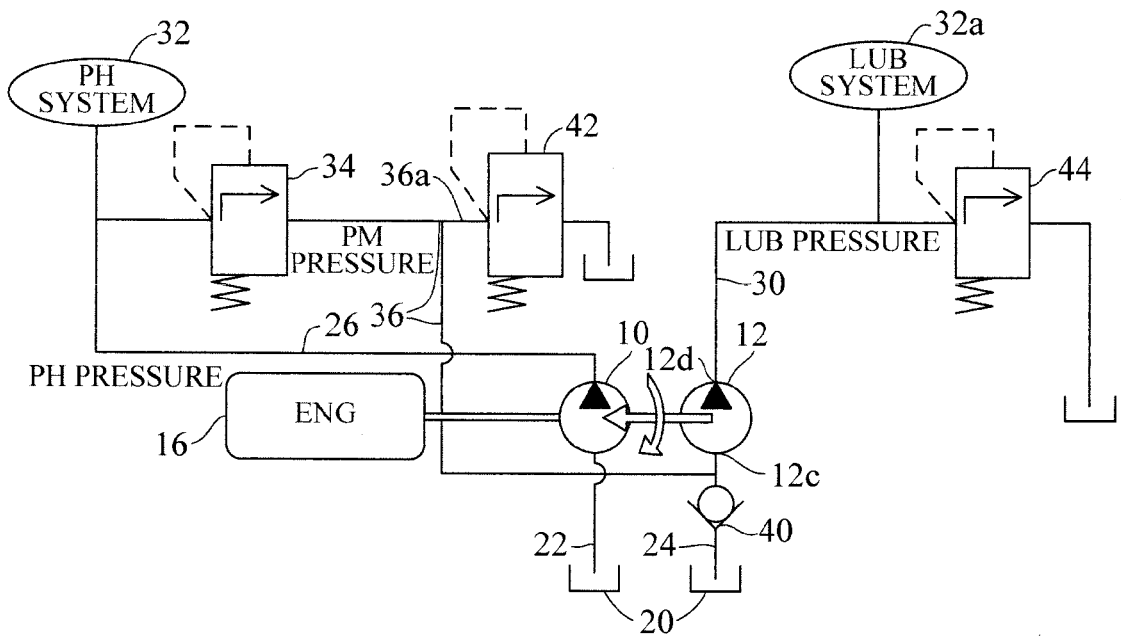
FIG. 4 is a schematic diagram similar to FIG. 1 showing the operation of the apparatus shown in FIG. 1 during high speed rotation of the engine.

FIG. 4 is a schematic diagram similar to FIG. 1 showing the operation of the apparatus during high speed rotation of the engine 16.

Also in the illustrated configuration, the first hydraulic pump 10 driven by the engine 16 pumps hydraulic oil from the reservoir 20 and discharges it into the third oil passage 26. The pressure of the discharged hydraulic oil is regulated to line pressure (PH pressure) by the first regulator valve 34 and supplied to the hydraulic actuator 32.

The excess hydraulic oil discharged from the output port 34c of the first regulator valve 34 is supplied through the fifth oil passage 36 and the second oil passage 24 to the intake port 12c of the second hydraulic pump 12, and since the rotational speed of the engine 16 is high, the pressure and flow volume of the excess hydraulic oil discharged from the first regulator valve 34 increases.

In this case, the pressure (backpressure) of the excess hydraulic oil discharged from the first regulator valve 34 is regulated by the second regulator valve 42 to the medium pressure (PM pressure) lower than the line pressure (PH pressure) by the prescribed value.

Therefore, a pressure difference occurs between the pressure (PM pressure) of the hydraulic oil supplied to the intake port 12c of the second hydraulic pump 12 and the pressure (LUB pressure) of the hydraulic oil discharged from the discharge port 12c thereof.

As a result, the second hydraulic pump 12 functions also as a hydraulic motor that generates a driving force and mechanically drives the first hydraulic pump 10 through the connecting member 12e. This achieves regeneration that reduces the pump drive torque of the engine 16.

Being intrinsically a pump, the second hydraulic pump 12 of course supplies to the lubrication system 32a of the hydraulic actuator 32 together with excess hydraulic oil discharged from the first regulator valve 34 even when it functions as a motor.

As mentioned above, a hydraulic pressure supply apparatus according to the embodiment is configured such that, it comprises a first hydraulic pump (10) having a first rotor (inner rotor) (10a) connected to a drive source (internal combustion engine) (16); a second hydraulic pump (12) having a second rotor (inner rotor) (12a) connected to the first rotor of the first hydraulic pump; a first oil passage (22) that connects an intake port (10c) of the first hydraulic pump (10) and a reservoir (20) that contains hydraulic oil; a second oil passage (24) that connects an intake port (12c) of the second hydraulic pump (12) and the reservoir (20); a third oil passage (26) that connects a discharge port (10d) of the first hydraulic pump (10) and a hydraulic actuator (32); a first regulator valve (34) that regulates pressure of the hydraulic oil discharged from the discharge port (10d) of the first hydraulic pump to the third oil passage to a line pressure (PH pressure); a fourth oil passage (30) that connects a discharge port (12d) of the second hydraulic pump (12) and a lubrication system (32a) of the hydraulic actuator (32); a fifth oil passage (36) that connects excess hydraulic oil discharged from the first regulator valve (34) to the second oil passage (24); a second regulator valve (42) that regulates pressure of the hydraulic oil discharged from the first regulator valve (34) to the fifth oil passage (36) to a medium pressure (PM pressure) that is lower than the line pressure; and a one-way valve (check valve) (40) that is installed in the second oil passage at a position between a junction (24a) to the fifth oil passage and the reservoir (20) and permits supply of hydraulic oil from the reservoir only to the second hydraulic pump (12). With this, it becomes possible to use excess hydraulic oil of the high line pressure (PH) for regeneration and at the same time, make the structure simple.

Specifically, since it is configured such that, the inner rotor (second rotor) 12a of the second hydraulic pump 12 is connected to the inner rotor (first rotor) 10a of the first hydraulic pump that is connected to the engine (drive source) 16 through the connecting member 12e, while excess hydraulic oil discharged from the first regulator valve 34 that regulates the pressure of the hydraulic oil discharged from the first hydraulic pump 10 to the line pressure is supplied to the second oil passage 24 that connects the second hydraulic pump 12 and the reservoir 20, it becomes possible to drive the second hydraulic pump 12 to function also as a hydraulic motor by the excess hydraulic oil discharged from the first regulator valve 34, whereby enabling to reduce the load (pump drive torque) of the engine (drive source) 16 by a proportional extent. With this, it becomes possible to use the excess hydraulic oil of the high line pressure to the regeneration, like the prior art of Patent Document 1. Moreover, since the regeneration requires only the first and second hydraulic pumps 10, 12, the structure can be made simple.

Further, since it is configured such that, the discharge port 12d of the second hydraulic pump 12 and the lubrication system 32a of the hydraulic actuator 32 is connected by the fourth oil passage 30, in other words, since it is not necessary to depressurize and supply high-pressure hydraulic oil discharged from the first hydraulic pump 10, it becomes possible to avoid loss of hydraulic pressure energy.

Further, since it is configured such that, the second regulator valve 42 regulates the pressure of the hydraulic oil discharged from the first regulator valve 34 to a pressure lower than the line pressure, i.e., to the medium pressure (PM pressure), in addition to the effects mentioned above, it becomes possible to maintain the backpressure of the output port 34c of the first regulator valve 34 to a proper value.

Furthermore, since it is configured to include: a third regulator valve (44) that regulates pressure of the hydraulic oil discharged from a discharge port (12d) of the second hydraulic pump (12) to the fourth oil passage (30) to a pressure (LUB pressure) still lower than the medium pressure regulated by the second regulator valve (42). With this, in addition to the effects mentioned above, it becomes possible to regulate the pressure of the hydraulic oil to be supplied to the lubrication system 32a of the hydraulic actuator 32 to a minimum necessary low pressure.

Furthermore, since it is configured such that, the second regulator valve (42) regulates pressure of the excess hydraulic oil discharged from the first regulator valve (34) to the fifth oil passage (36) to the medium pressure that is lower than the line pressure, by regulating flow volume so that backpressure of an output port (34c) of the first regulator valve (34) becomes lower than the line pressure by a prescribed pressure.

With this, in addition to the effects mentioned above, it becomes possible to maintain the backpressure of the output port 34c of the first regulator valve 34 to a proper value. Accordingly, when the first hydraulic pump 10 is driven at high speed rotation of the engine 16, it becomes possible to make the second hydraulic pump 12 function as a hydraulic motor, thereby enabling to achieve regeneration that reduces the pump drive torque of the engine 16.

In the above, although the hydraulic pressure supply apparatus is explained taking a hydraulic pressure supply apparatus for an automatic transmission as an example, it should not be limited thereto. Moreover, although the engine 16 is exemplified as the drive source, it should not be limited thereto. The drive source can be a hybrid of an engine and electric motor, or an electric motor itself.

INDUSTRIAL APPLICABILITY

According to the invention, it is configured to have a first hydraulic pump connected to a drive source, a second hydraulic pump connected to a rotor of the first hydraulic pump, a first regulator valve that regulates pressure of the hydraulic oil discharged from the first hydraulic pump to a third oil passage that connects a discharge port of the first hydraulic pump and a hydraulic actuator, a fourth oil passage that connects the second hydraulic pump and a lubrication system of the hydraulic actuator, a second regulator valve that regulates pressure of the hydraulic oil discharged from the first regulator valve to a pressure lower than a line pressure, and a check valve that is installed in a second oil passage connecting the second hydraulic pump and a reservoir and permits supply of hydraulic oil from the reservoir only to the second hydraulic pump, thereby enabling to use excess hydraulic oil for regeneration and make the structure simple.

DESCRIPTION OF SYMBOLS

10 first hydraulic pump, 10*a* rotor (inner rotor), 10*c* intake port, 10*d* discharge port, 12 second hydraulic pump, 12*a* rotor (inner rotor), 12*c* intake port, 12*d* discharge port, 16 engine (internal combustion engine; drive source), 20 reservoir, 22 first oil passage, 24 second oil passage, 26 third oil passage, 30 fourth oil passage, 32 hydraulic actuator, 32*a* lubrication system of hydraulic actuator, 34 first regulator valve, 34*b* input port, 34*c* output port, 36 fifth oil passage, 40 check valve (one-way valve), 42 second regulator valve, 42*b* input port, 42*c* output port, 44 third regulator valve, 44*b* input port, 44*c* output port

The invention claimed is:
1. A hydraulic pressure supply apparatus, comprising:
a first hydraulic pump having a first rotor connected to a drive source;
a second hydraulic pump having a second rotor connected to the first rotor of the first hydraulic pump;
a first oil passage that connects an intake port of the first hydraulic pump and a reservoir that contains hydraulic oil;
a second oil passage that connects an intake port of the second hydraulic pump and the reservoir;
a third oil passage that connects a discharge port of the first hydraulic pump and a hydraulic actuator;
a first regulator valve that regulates pressure of the hydraulic oil discharged from the discharge port of the first hydraulic pump to the third oil passage to a line pressure;
a fourth oil passage that connects a discharge port of the second hydraulic pump and a lubrication system of the hydraulic actuator;
a fifth oil passage that connects excess hydraulic oil discharged from the first regulator valve to the second oil passage;
a second regulator valve that regulates pressure of the excess hydraulic oil discharged from the first regulator valve to the fifth oil passage to a medium pressure that is lower than the line pressure; and
an one-way valve that is installed in the second oil passage at a position between a junction to the fifth oil passage and the reservoir and permits supply of hydraulic oil from the reservoir only to the second hydraulic pump.
2. The apparatus according to claim 1, further including:
a third regulator valve that regulates pressure of the hydraulic oil discharged from a discharge port of the second hydraulic pump to the fourth oil passage to a pressure lower than the medium pressure regulated by the second regulator valve.
3. The apparatus according to claim 1, wherein the second regulator valve regulates pressure of the excess hydraulic oil discharged from the first regulator valve to the fifth oil passage to the medium pressure that is lower than the line pressure, by regulating flow volume so that backpressure of an output port of the first regulator valve becomes lower than the line pressure by a prescribed pressure.

\* \* \* \* \*